US008411661B2

(12) United States Patent
Lipka (10) Patent No.: US 8,411,661 B2
(45) Date of Patent: Apr. 2, 2013

(54) TECHNIQUE FOR SC-FDMA SIGNAL GENERATION (75) Inventor: Dietmar Lipka, Berg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 260 days.

(21) Appl. No.: 12/882,645

(22) Filed: Sep. 15, 2010

(65) Prior Publication Data

US 2011/0064069 A1   Mar. 17, 2011

(30) Foreign Application Priority Data

Sep. 15, 2009   (EP) ................................... 09011766

(51) Int. Cl.
 *H04B 7/208*   (2006.01)
(52) U.S. Cl. ......................... 370/344; 370/436; 370/478
(58) Field of Classification Search ........................ None
See application file for complete search history.

(56) References Cited

U.S. PATENT DOCUMENTS

| | | | | |
|---|---|---|---|---|
| 7,394,844 | B1 * | 7/2008 | Orr ............................... | 375/135 |
| 2007/0183386 | A1 * | 8/2007 | Muharemovic et al. ...... | 370/344 |
| 2009/0046629 | A1 | 2/2009 | Jiang et al. | |
| 2009/0083352 | A1 | 3/2009 | Azadet et al. | |

FOREIGN PATENT DOCUMENTS

WO   WO 2008/056900   *   5/2008

OTHER PUBLICATIONS

Shift Theorem (found in Wikipedia dated, Feb. 2009).*
IEEE Vehicular Technology Magazine Sep. 2006 Single Carrier FDMA for Uplink Wireless Transmission Hyung myung et al.*
IEEE Transactions on Broadcasting, vol. 53, No. 3 Sep. 2007 PAPR Reduction of OFDM Signals Using Partial Transmit Sequences With Low Computational Complexity Tao Jiang et al.*
EURASIP Journal on Advances in Signal Processing vol. 2009, Article ID 750534, 9 pages Jan. 2009 LocalizedMode DFT-S-OFDMA Implementation Using Frequency and Time Domain Interpolation Ari Viholainen et al.*
DFT (Discrete Fopurier tranfsorm found in Wikipedia dated, Feb. 2009 ).*
3GPP TS 136 211 V 8.7 Jun. 2009 Note: ( also in IDS—NPL).*
Prasad, K. et al. Fast Interpolation Algorithm Using FFT. Electronic Letter, IEE Stevenage, GB. vol. 22, No. 4, Feb. 13, 1986.
3GGP. LTE; Evolved Universal Terrestrial Radio Access (E-UTRA); Physical Channels and Modulation, 3GPP TS 36.211 version 8.7.0 (Release 8). ETSI TS 136.211 v8.7.0 01 Jun. 2009.

* cited by examiner

*Primary Examiner* — Chirag Shah
*Assistant Examiner* — Rina Pancholi (57) ABSTRACT

A method and device for generating a Single-Carrier Frequency Division Multiple Access (SC-FDMA) signal having a transmission bandwidth and a Constant Amplitude Zero-Autocorrelation (CAZAC) sequence of length $N_{CAZAC}$. The SC-FDMA signal is presumed to have a time-domain formulation with a term representative of an Inverse Discrete Fourier Transform (IDFT) of length M, where $M > N_{CAZAC}$. A frequency-domain representation of the CAZAC sequence is mapped to $N_{CAZAC}$ of $M_{SEQ}$ frequency points, where $N_{CAZAC} < M_{SEQ} < M$, and the remaining frequency points are filled with zeros to obtain $M_{SEQ}$ frequency-domain samples. An IDFT of size $M_{SEQ}$ is applied to the resulting frequency-domain samples to obtain a sub-sampled time-domain representation of the CAZAC sequence, which is then up-sampled according to the transmission bandwidth to generate the SC-FDMA signal.

18 Claims, 6 Drawing Sheets

TECHNIQUE FOR SC-FDMA SIGNAL GENERATION

TECHNICAL FIELD

The present disclosure generally relates to generation of Single-Carrier Frequency Division Multiple Access (SC-FDMA) signals. In particular, SC-FDMA signal generation technique based on symbol sequences giving rise to signals having a Constant Amplitude Zero Auto-Correlation (CAZAC) waveform is disclosed.

BACKGROUND

In multi-transmitter communications networks, channel access techniques allow multiple transmitters connected to the same physical channel to share its transmission capacity. Various such channel access techniques are known in the art. For example, in second generation communications systems according to the Global System for Mobile communications (GSM) standard, Time Division Multiple Access (TDMA) techniques are utilized to divide a specific frequency channel into individual time slots assigned to individual transmitters. In third generation communications systems, Code Division Multiple Access (CDMA) techniques divide channel access in the signal space by employing a combination of spread spectrum operations and a special coding scheme in which each transmitter is assigned an individual code. The next advance in wireless communications systems considers Orthogonal Frequency Division Multiple Access (OFDMA) techniques to achieve still higher bit rates.

One major advantage of OFDMA over other channel access techniques is its robustness in the presence of multi-path signal propagation. On the other hand, the waveform of OFDMA signals exhibits very pronounced envelope fluctuations resulting in a high Peak-to-Average Power Ratio (PAPR). Signals having a high PAPR require highly linear power amplifiers to avoid excessive inter-modulation distortion, and these power amplifiers have to be operated with a large back-off from their peak power. These demands result in a low power efficiency, which places a significant burden specifically on battery operated transmitters as utilized in mobile telephones and similar portable user equipment.

The disadvantage of a high PAPR inherent to OFDMA is to a certain extent overcome by the Single Carrier Frequency Division Multiple Access (SC-FDMA) technique, which can be regarded as a modification of the OFDMA technique. The Third Generation Partnership Project (3GPP) is considering using both OFDMA and SC-FDMA in next generation communications systems currently standardized in the Long Term Evolution (LTE) project. According to section 5 of the 3GPP Technical Specification TS 36.211 "Physical Channels and Modulation", V8.7.0 of May 2009, SC-FDMA will be implemented in LTE user equipment for the uplink direction towards the access network. OFDMA, on the other hand, will be used in the downlink direction from the LTE access network towards the user equipment.

Figure 1:
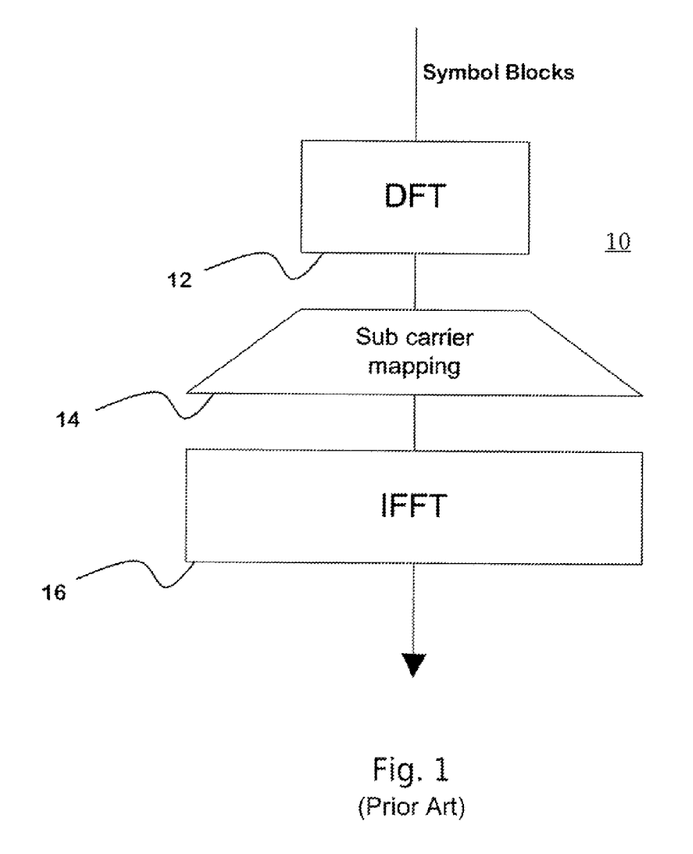
FIG. 1 schematically illustrates an exemplary implementation of an SC-FDMA modulator stage.

An exemplary realization of a conventional SC-FDMA modulator stage 10 for LTE user equipment is schematically illustrated in FIG. 1. The modulator stage 10 receives as input signal a multilevel sequence of complex-valued symbols in one of several possible modulation formats such as Binary Phase Shift Keying (BPSK) or 16 level Quadrature Amplitude Modulation (16-QAM). The modulation symbols are received in blocks containing N data symbols each. Every block of N data symbols is initially subjected to an N-point Discrete Fourier Transform (DFT) in a DFT block 12. The DFT block 12 spreads the N data symbols over M frequency points or subcarriers (N<M) to obtain a frequency domain representation of the N data symbols that is input to a mapping block 14. The mapping block 14 outputs a set of M complex-valued subcarrier amplitudes. Exactly N of these amplitudes (corresponding to the M data symbols) will be non-zero, while the remaining amplitudes have been set to zero.

The M subcarrier amplitudes output by the mapping block 14 are re-transformed by an Inverse Fast Fourier Transform (IFFT) block 16 into a time domain signal. The resulting time domain signal may then be subjected to a phase rotation to correct any phase errors introduced by the previous signal processing operations in blocks 12 to 16. Furthermore, a Cyclic Prefix (CP) will be inserted into the output signal of the IFFT block 16. The CP provides a guard-time between two sequentially transmitted symbol blocks to reduce inter-block interference caused by multi-path propagation.

Except for an omission of the DFT block 12 used to spread the bits of the input symbols over the available subcarriers, an OFDMA modulator stage has a similar configuration as the SC-FDMA modulator stage 10 shown in FIG. 1. For this reason, SC-FDMA is sometimes also interpreted as DFT-spread OFDMA.

The modulation process described above for data symbols is also applied to random access preamble symbols when generating a random access signal for the PRACH as defined in section 5.7 of TS 36.211. The random access signal is used upon an initial access in a cell for uplink synchronization and for getting attached to the network for subsequent data traffic.

The generation of the random access signal starts with generation of a Zadoff-Chu sequence having a length of either 139 or 839 complex-valued symbols (also called samples) which, when modulated onto a radio carrier, give rise to an electromagnetic signal of constant amplitude. Signals comprising cyclically shifted versions of a specific Zadoff-Chu sequence do not cross-correlate (i.e., remain orthogonal to each other) when recovered at a receiver, provided that the cyclic shift is greater than a specific threshold defined by propagation delay and multi-path delay spread. An electromagnetic signal carrying a Zadoff-Chu sequence thus has a CAZAC waveform.

Once a Zadoff-Chu sequence of the required length has been generated, the resulting random access preamble symbols are transformed by the DFT block 12 of FIG. 1 to the frequency domain. Since both 139 and 839 are prime numbers, the mathematical DFT operations cannot be simplified or reduced (using, e.g., a Fast Fourier Transform, or FFT). After the mapping block 14 has applied a mapping operation to the output of the DFT block 12, the IFFT block 16 performs an IFFT of size 4.096 (in the case of 139 samples) or 24.576 (in the case of 839 samples).

It has been found that the SC-FDMA modulator stage 10 consumes considerably more hardware resources when processing a CAZAC-based random access signal compared to the processing of conventional data signals.

SUMMARY

Accordingly, it is an object of the present invention to provide an alternative SC-FDMA signal generation technique that consumes less hardware resources.

According to a first aspect, a method of generating an SC-FDMA signal having a transmission bandwidth and comprising a CAZAC sequence of length $N_{CAZAC}$ is provided, wherein the SC-FDMA signal has a time domain formulation with a term representative of an Inverse Discrete Fourier Transform, or IDFT, of length M, with $M > N_{CAZAC}$, the method comprising providing a frequency-domain representation of the CAZAC sequence; mapping the frequency-domain representation of the CAZAC sequence to $N_{CAZAC}$ of $M_{SEQ}$ frequency points, with $N_{CAZAC} < M_{SEQ} < M$, and filling the remaining $M_{SEQ} - N_{CAZAC}$ frequency points with zeros to obtain $M_{SEQ}$ frequency-domain samples; applying an IDFT of size $M_{SEQ}$ to the resulting frequency-domain samples to obtain a sub-sampled time-domain representation of the CAZAC sequence; and up-sampling the sub-sampled time-domain representation of the CAZAC sequence according to the transmission bandwidth to generate the SC-FDMA signal.

The application of an IDFT having a size smaller than M in combination with a subsequent up-sampling step to the transmission bandwidth can in many scenarios save hardware resources and/or processing time compared to a "full" IDFT of size M. Such an approach is particularly useful in cases in which the actually occupied bandwidth of the SC-FDMA signal is much smaller than the designated transmission bandwidth. The transmission bandwidth can be a fixed or variable carrier or cell bandwidth of the telecommunications system. In an exemplary LTE scenario, the transmission bandwidth may be cell-specific and adjustable up to a maximum value of 20 MHz in accordance with the LTE uplink resource grid.

$M_{SEQ}$ can be selected to be a power of two fraction of M. Such a selection allows the utilization of efficient up-sampling techniques such as polyphase filters. Additionally, or as an alternative, $M_{SEQ}$ may be selected to be the smallest number that allows the utilization of FFT techniques for the IDFT ("IFFT").

The term $x_{SEQ}[m']$ representative of the IDFT in the time domain representation of the SC-FDMA signal may essentially (e.g., neglecting a cyclic prefix and similar formatting parts) have the form of $$x_{SEQ}[m'] = \left( \sum_{k'=0}^{M-1} X'[k'] \cdot e^{j\frac{2\pi}{M}k' \cdot m'} \right),$$

with m' being a discrete time variable and X'[k] being derived from the frequency-domain representation X[k] of the CAZAC sequence, with k being a discrete frequency variable.

The term $x_{SEQ}[m']$ representative of the IDFT of length $M > N_{CAZAC}$ can be derived from the frequency-domain representation X[k] of the CAZAC sequence using zero-padding. In one implementation, zero-padding is performed in accordance with $$X'[k'] = \begin{cases} X[k], & k' = k = 0, \ldots, N_{CAZAC} - 1 \\ 0, & k' = N_{CAZAC}, \ldots, M-1, \end{cases}$$

or $$X'[k'] =$$

$$\begin{cases} X[k], & k' = 0, \ldots, \left\lfloor \frac{N_{CAZAC}}{2} \right\rfloor & k = \left\lfloor \frac{N_{CAZAC}}{2} \right\rfloor, \ldots, N_{CAZAC} - 1 \\ X[k], & k' = M_{SEQ} - \left\lfloor \frac{N_{ZC}}{2} \right\rfloor, \ldots, M-1, & k = 0, \ldots, \left\lfloor \frac{N_{CAZAC}}{2} \right\rfloor - 1 \\ 0, & k' = \left\lfloor \frac{N_{CAZAC}}{2} \right\rfloor + 1, \ldots, \begin{matrix} M_{SEQ} - \\ \left\lfloor \frac{N_{CAZAC}}{2} \right\rfloor - 1 \end{matrix} \end{cases}$$

The method may further comprise adding a cyclic prefix to the sub-sampled time-domain representation of the CAZAC sequence prior to up-sampling. In one implementation, the up-sampling is performed using interpolation. The interpolation may be achieved using one or more filters (such as polyphase up-sampling filters).

The method may also comprise adding a transient component to the time-domain representation of the CAZAC sequence prior to up-sampling, and removing the transient component after up-sampling has been performed. In a filtering implementation of the interpolation, the transient component may be helpful in the context of compensating filter transients of the up-sampling filter.

A frequency shift may be applied to the SC-FDMA signal after the up-sampling operation to shift the SC-FDMA signal to its designated frequency location. The frequency shift may be applied in the time domain in accordance with $$s[m] = s'[m] \cdot e^{j\frac{2\pi}{M}K \cdot m},$$

with m being a discrete time variable, s[m] being the SC-FDMA signal in the time domain after the frequency shift, s'[m] being the SC-FDMA signal in the time domain prior to the frequency shift, and K being a phase term representative of the frequency shift.

The SC-FDMA signal can take the form of a random access signal to be transmitted on a Physical Random Access Channel (PRACH). In an PRACH implementation, the method may further comprise performing, based on the random access signal, at least one of uplink synchronization and network attachment. The method can be performed by a user terminal in accordance with at least one of the LTE standard and the LTE-Advanced standard. Accordingly, the PRACH may be the PRACH of an LTE or LTE-Advanced compliant telecommunications system.

The CAZAC sequence may be a Zadoff-Chu sequence or any Zadoff-Chu-like sequence giving rise to a CAZAC waveform when modulated onto a carrier. Moreover, the length $N_{CAZAC}$ of the CAZAC sequence may be a prime number.

The techniques presented herein may be realised in the form of software, in the form of hardware, or using a combined software/hardware approach. As regards a soft-aspect, a computer program product comprising program code portions for performing the steps presented herein when the computer program product is run on one or more computing devices may be provided. The computer program product may be stored on a computer-readable recording medium such as a memory chip, a CD-ROM, a hard disk, and so on.

Moreover, the computer program product may be provided for download onto such a recording medium.

According to a further aspect, a device for generating an SC-FDMA signal having a transmission bandwidth and comprising a CAZAC sequence of length $N_{CAZAC}$ is provided, wherein the SC-FDMA signal has a time domain formulation with a term representative of an IDFT of length M, with $M > N_{CAZAC}$. The device comprises a provisioning unit adapted to provide a frequency-domain representation of the CAZAC sequence; a mapping unit adapted to map the frequency-domain representation of the CAZAC sequence to $N_{CAZAC}$ of $M_{SEQ}$ frequency points, with $N_{CAZAC} < M_{SEQ} < M$, and to fill the remaining $M_{SEQ} - N_{CAZAC}$ frequency points with zeros to obtain $M_{SEQ}$ frequency-domain samples; an IDFT unit adapted to apply an IDFT of size $M_{SEQ}$ to the resulting frequency-domain samples to obtain a sub-sampled time-domain representation of the CAZAC sequence; and an up-sampling unit adapted to up-sample the sub-sampled time-domain representation of the CAZAC sequence according to the transmission bandwidth to generate the SC-FDMA signal. The up-sampling unit may comprise at least one of an interpolator, a filter, and a filter bank (e.g., the interpolator may be implemented in the form of a filter or filter bank).

The device may further comprise a cyclic prefix adder adapted to add a cyclic prefix to the sub-sampled time-domain representation of the CAZAC sequence prior to up-sampling. Moreover, the device may comprise a frequency shifter adapted to apply a frequency shift to the SC-FDMA signal after up-sampling to shift the SC-FDMA signal to its designated frequency location.

Also provided is a user terminal comprising such a device. The user terminal may be configured to support SC-FDMA and may be compliant with LTE or LTE-Advanced. Possible implementations of the user terminal include mobile telephones, network or data cards, portable computers with network access capabilities and so on.

BRIEF DESCRIPTION OF THE DRAWINGS

Further aspects and advantages of the technique presented herein will become apparent from the following description of preferred embodiments and the drawings, wherein.

DETAILED DESCRIPTION

In the following description of preferred embodiments, for purposes of explanation and not limitation, specific details are set forth (such as particular signal processing components and sequences of steps) in order to provide a thorough understanding of the present invention. It will be apparent to one skilled in the art that the techniques described herein may be practiced in other embodiments that depart from these specific details. For example, while the following embodiments will primarily be described in the context of preamble signal generation, the present invention can also be applied to other signal types generated on the basis of CAZAC sequences. While the embodiments will relate to an exemplary LTE implementation, it will be readily apparent that the techniques described herein may also be implemented in other communications networks such as LTE-Advanced networks.

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in the context of methods and devices, the invention may also be embodied in a computer program product as well as in a system comprising a computer processor and a memory coupled to the processor, wherein the memory is encoded with one or more programs that may perform the services, functions and steps disclosed herein.

Figure 2:
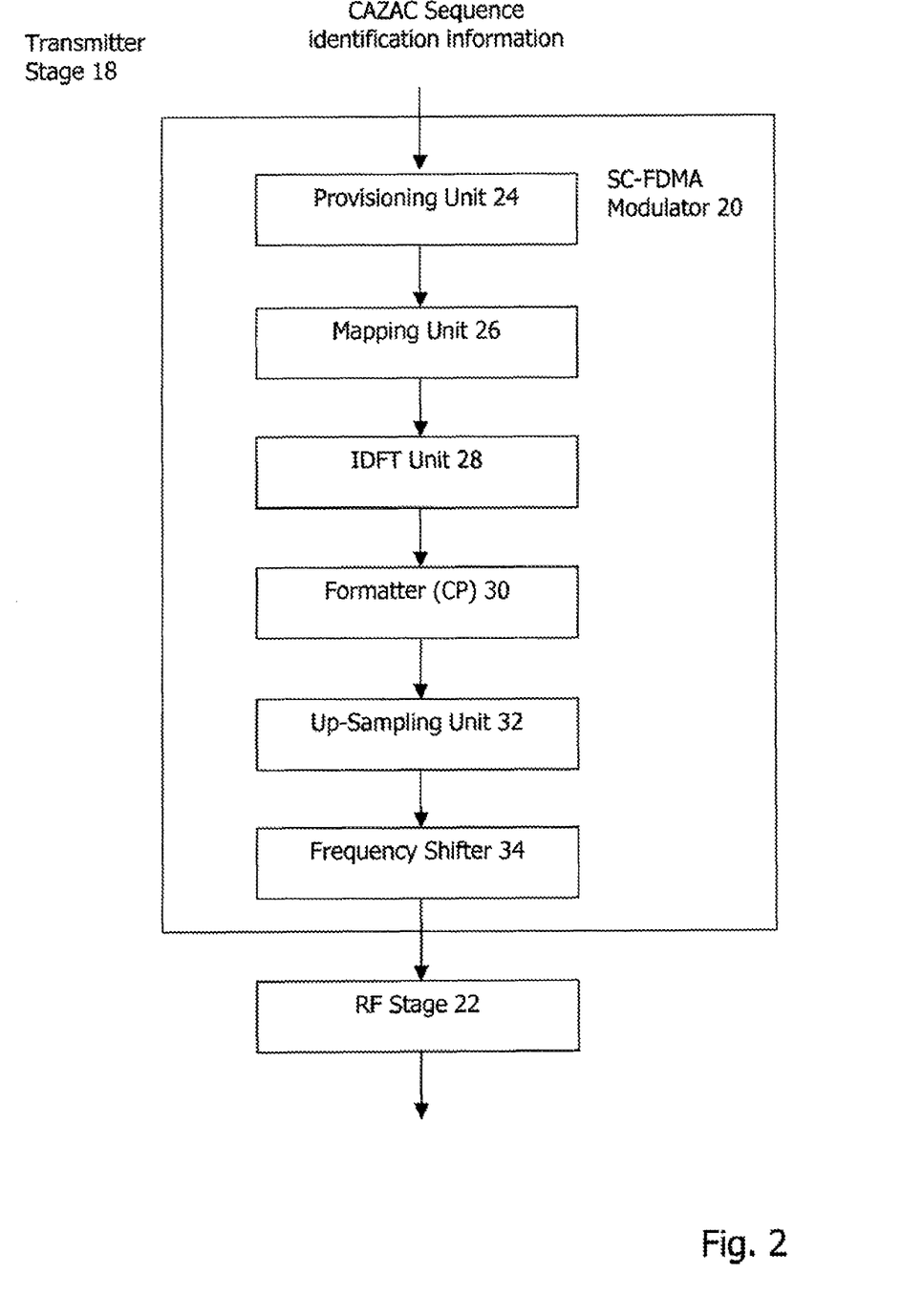
FIG. 2 schematically illustrates a transmitter stage including an embodiment of a device for generating a random access signal.

FIG. 2 shows an embodiment of a transmitter stage 18 to be incorporated for example as a network card or data stick in a stationary or portable computer. The transmitter stage 18 comprises an SC-FDMA modulator 20 and a Radio Frequency (RF) stage 22. The RF stage 22 is configured to up-convert an output signal of the SC-FDMA modulator 20 into the RF range and to amplify the up-converted signal prior to transmission via one or more antennas (not shown). It will be understood that the transmitter stage 18 may comprise further components not shown in FIG. 2.

In an exemplary LTE scenario the SC-FDMA modulator 20 of FIG. 2 performs the same basic SC-FDMA processing operations as described above with reference to FIG. 1. To this end, the SC-FDMA modulator 20 comprises a provisioning unit 24 adapted to provide a frequency domain representation of the CAZAC sequence to be transmitted, a mapping unit 26 adapted to map the resulting frequency domain representation to a pre-determined frequency location (i.e., to pre-determined frequency points or subcarriers in the frequency domain) and an IDFT unit 28 adapted to transform the mapped frequency domain representation into the time domain. As illustrated in FIG. 2, a formatter 30, an up-sampling unit 32 and a frequency shifter 34 are provided downstream of the IDFT unit 28.

The provisioning unit 24 and the mapping unit 26 may in one implementation be realized in the same or a similar manner as the DFT block 12 and the mapping block 14, respectively, of FIG. 1. The IDFT unit 28, on the other hand, is configured in a different manner than the "standard" IFFT block 16 as will be described below in more detail.

In the following, the operation of the SC-FDMA modulator 20 in an LTE compliant telecommunications network will be described with reference to a method embodiment illustrated in the schematic flow diagram 300 of FIG. 3. The operation will be explained for a random access signal transmitted on the PRACH. The random access signal comprises a random access preamble generated from a CAZAC sequence of the Zadoff-Chu type as specified in section 5.7 of TS 36.211.

Figure 3:
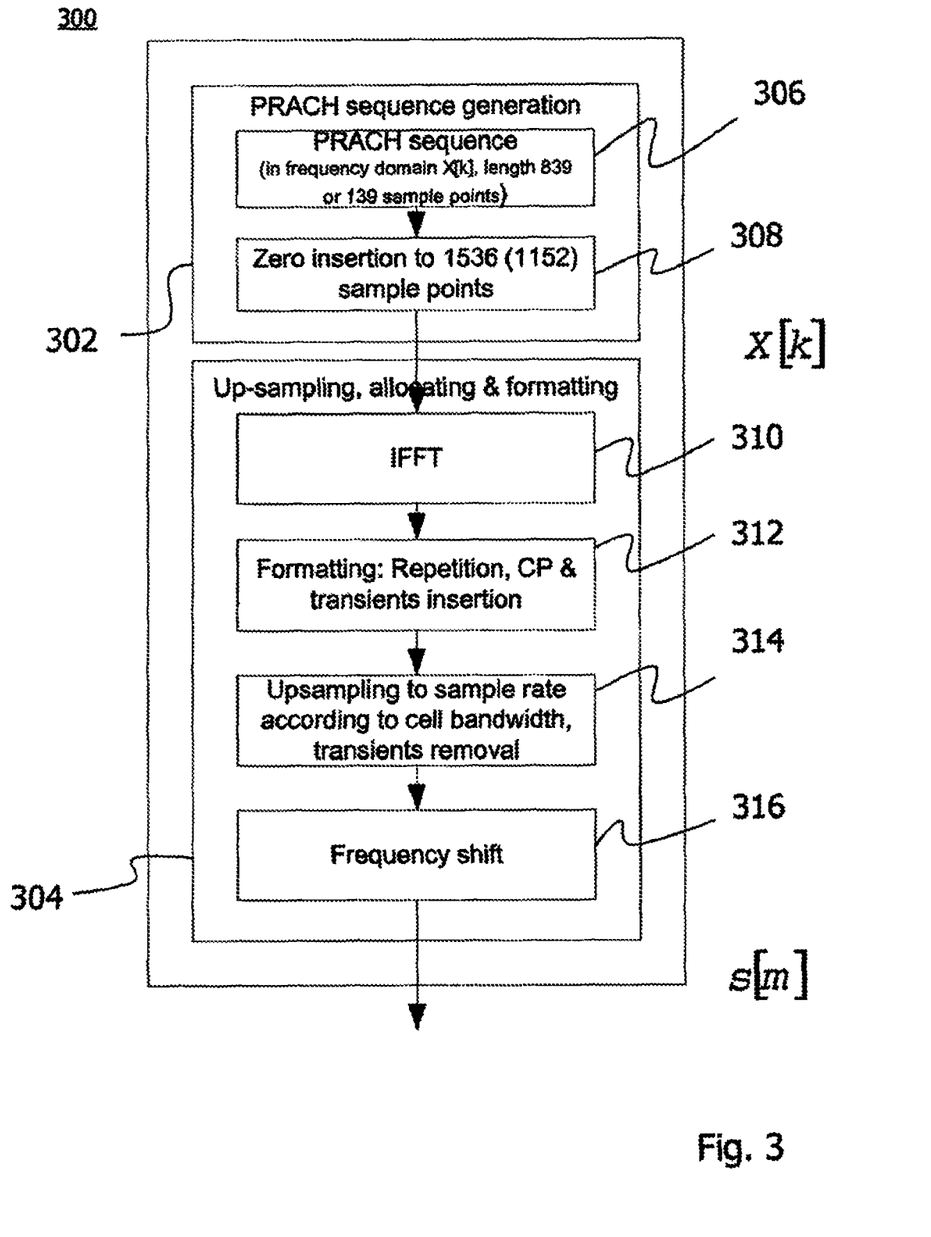
FIG. 3 shows a flow diagram according to a method embodiment.

As illustrated by the flow diagram 300 of FIG. 3, the operation of the SC-FDMA modulator 20 can generally be divided into two processing stages. In a first stage 302, the Zadoff-Chu sequence for the LTE PARCH is generated and transferred in the frequency domain by the provisioning unit 24. The provisioning unit 24 can also be configured to generate the Zadoff-Chu sequence directly in the frequency domain. The first stage additionally comprises a mapping operation. In a second stage 304, transformation, formatting, up-sampling and frequency shifting operations are applied to the frequency domain representation of the Zadoff-Chu sequence generated in the first stage 302.

The operation of the provisioning unit 24 starts in step 306 with identification of the specific Zadoff-Chu sequence that is to be generated. To this end identification information comprising root index u and cyclic shift C, is evaluated as generally described in section 5.7.2 of TS 36.211. The identification information may be received from the network and/or determined locally.

In TS 36.211, the Zadoff-Chu sequence for PRACH random access signaling is defined by the discrete time domain function $$x_{u,v}[n] = x_u[(n+C_v) \bmod N_{ZC}],$$

where $$x_u[n] = e^{-j\frac{2\pi}{N_{ZC}}un(n+1)/2}$$

is the root or base Zadoff-Chu function of length $N_{ZC}$ with the root index u. $C_v$ is the cyclic shift to generate distinguishable random access signals. u and $C_v$ thus uniquely identify a specific Zadoff-Chu sequence (and a specific random access preamble).

In the one implementation of the provisioning unit 24 (that is similar to the DFT block 12 illustrated in FIG. 1), $x_u[n]$ will be generated in the time domain and then transformed into the frequency domain using a DFT. Since the possible lengths $N_{ZC}$ of the input sequence (i.e., 839 and 139) are prime numbers, it is not possible to use FFT techniques for the DFT. Especially for $N_{ZC}$=839 this fact results in an inefficient computational algorithm.

It has been found that a closed analytical solution for the transformed Zadoff-Chu sequence in the frequency domain can be given by $$X_{u,v}[k] = \sqrt{N_{ZC}}\, e^{j\phi_u} \cdot e^{j\frac{2\pi}{N_{ZC}}k\left(C_v+(k+u)\cdot 2^{-1}u^{-1}\right)}.$$

$u^{-1}$ is the modulo inverse of u, i.e., it fulfills the equation $(u \cdot u^{-1}) \bmod N_{ZC}=1$. In the same way $2^{-1}$ is the modulo inverse of 2, which equates to $2^{-1}$=420 for $N_{ZC}$=839. The constant phase factor $$e^{j\phi_u} = \frac{1}{\sqrt{N_{ZC}}} \sum_{n=0}^{N_{ZC}-1} x_{u,v}[n]$$

does not have any meaning for the final sequence and can thus be neglected.

Based on the above analytical solution for the transformed Zadoff-Chu sequence in the frequency domain, another implementation of the provisioning unit 24 generates the Zadoff-Chu sequence directly in the frequency domain. To this end recursive calculation techniques may be applied for the integer term of the second exponential function.

Once the required Zadoff-Chu sequence has been identified and transformed to or generated in the frequency domain, the resulting frequency domain representation of the Zadoff-Chu sequence is input to the mapping unit 26 and subjected to a mapping operation in step 308. Upon receipt of the transformed Zadoff-Chu sequence, the mapping unit 26 maps the frequency domain representation of the Zadoff-Chu sequence (in the form of typically 839 subcarrier amplitudes) to a number of frequency points (or subcarriers) defined, inter alia, by the current carrier or cell bandwidth. The remaining sample points will be set to zero.

After the mapping step 308, the frequency domain representation of the Zadoff-Chu sequence has been moved to its (initial) frequency location and the first processing stage 302 has been concluded. Next, the second processing stage 304 will be entered.

The second processing stage 304 and the operation of the corresponding processing units 28, 30, 32 and 34 substantially differs in the present embodiment from the conventional IFFT block 16 of FIG. 1 in that interpolation techniques are combined with a small size IFFT and a linear phase ramp to generate the SC-FDMA random access signal. To better understand the operation of the second processing stage 304, it is necessary to first consider the final PRACH preamble sequence s[m] in the time domain as defined in accordance with TS 36.211.

The time domain representation s[m] can be written as $$s[m] = \beta_{PRACH}\left(\sum_{k=0}^{N_{ZC}-1} X[k] \cdot e^{j\frac{2\pi}{KN}k\cdot(m-M_{CP})}\right) \cdot e^{j\frac{2\pi}{KN}\varphi\cdot(m-M_{CP})} \cdot e^{j\frac{2\pi}{N}(k_0+1/2)\cdot(m-M_{CP})},$$

Reducing this term to the base sequence by excluding the cyclic prefix part yields $$s_{SEQ}[m'] = \beta_{PRACH}\left(\sum_{k=0}^{N_{ZC}-1} X[k] \cdot e^{j\frac{2\pi}{KN}k\cdot m'}\right) \cdot e^{j\frac{2\pi}{KN}\varphi\cdot m'} \cdot e^{j\frac{2\pi}{N}(k_0+1/2)\cdot m'}$$

$$= \beta_{PRACH}\left(\sum_{k'=0}^{K\cdot N-1} X'[k'] \cdot e^{j\frac{2\pi}{KN}k'\cdot m'}\right) \cdot e^{j\frac{2\pi}{KN}\varphi\cdot m'} \cdot e^{j\frac{2\pi}{N}(k_0+1/2)\cdot m'}$$

$$= \beta_{PRACH} \cdot e^{j\frac{2\pi}{KN}\varphi\cdot m'} \cdot e^{j\frac{2\pi}{N}(k_0+1/2)\cdot m'} \cdot x_{SEQ}[m'],$$

where m'=0, 1, ..., M−1, with M=K·N, N is a constant equal to 2.048 for subcarrier spacing Δf=15 kHz and 4.096 for Δf=7.5 kHz, K=Δf/Δf$_{RA}$ accounts for the difference in subcarrier spacing between the random access preamble and uplink data transmission (typically K=12), and $$X'[k'] = \begin{cases} X[k], & k'=k=0, \ldots, N_{ZC}-1 \\ 0, & k=N_{ZC}, \ldots, K\cdot N-1. \end{cases}$$

The inner sum is a K·N-point IDFT of X'[k], which is X[k] with zero-padding from its end. The IDFT result is multiplied with a first phase rotation (specified by the parameter φ) that is supposed to place the RACH spectrum in the middle of 6 LTE Resource Blocks (RBs). The second phase rotation is the frequency shift on the LTE resource grid according to the frequency allocation of the RACH determined by $k_0$. $k_0$ is defined in sections 5.7.1 and 5.7.3 of TS 36.211.

In the extreme case of 20 MHz transmission (cell) bandwidth, the IDFT thus has a size of K·N=12*2.048=24.576, which is computationally quite expensive keeping in mind that only 839 samples are non-zero (i.e., almost all of the signal vector consists of zeros). This fact requires a lot more hardware resources and, in particular, much more memory resources than the SC-FDMA modulation in the data path (where an IFFT can typically be used).

It has been found that hardware resources can be saved by exploiting the fact that the RACH bandwidth is about 1.05 MHz. Consequently, the IDFT can be done assuming a sample rate of 1.92 MHz (1.44 MHz for 15 MHz bandwidth), which reduces N to N'=128 and thus yields a 12*128=1.536-point IDFT (9*128=1.152-point IDFT for 15 MHz transmission bandwidth), i.e. $M_{SEQ}=K \cdot N'=1.536 (1.152)$. This sample rate typically corresponds to a sub-sampling compared to the conventional scenario.

$M_{SEQ}$ is chosen such that it is the smallest possible number that allows to use efficient FFT techniques for the IDFT ("IFFT") performed in step 310 by IDFT unit 28. Additionally, $M_{SEQ}$ is selected to be a power of 2 fraction of the final sequence length K·N. The resulting time domain sequence $x'_{SEQ}[m']$ will finally have to be up-sampled to the designated transmission bandwidth and frequency shifted in the time domain as will be described further below. However, $x'_{SEQ}[m']$ is not well suited for up-sampling (e.g., by an interpolation filter), since due to the zero padding of X[k] from its end, the RACH spectrum is not centered around Direct Current (DC).

In order to facilitate the up-sampling operation, in one variant of the present embodiment the zero padding is modified. To this end, the formula for $s_{SEQ}[m']$ with N'=128 is re-arranged as follows:

$$s_{SEQ}[m'] = \beta_{PRACH} \left( \sum_{k'=0}^{K \cdot N - 1} X'[k'] \cdot e^{j\frac{2\pi}{KN}k' \cdot m'} \right) \cdot e^{j\frac{2\pi}{KN}\varphi \cdot m'} \cdot e^{j\frac{2\pi}{N}(k_0+1/2) \cdot m'}$$

$$= \beta_{PRACH} \left( \sum_{k'=0}^{K \cdot N - 1} X''[k'] \cdot e^{j\frac{2\pi}{KN}k' \cdot m'} \right) \cdot e^{j\frac{2\pi}{KN}(\varphi + \lfloor N_{ZC}/2 \rfloor) \cdot m'} \cdot$$

$$e^{j\frac{2\pi}{N}(k_0+1/2) \cdot m'}$$

$$= \beta_{PRACH} \cdot e^{j\frac{2\pi}{KN}(\varphi + \lfloor N_{ZC}/2 \rfloor) \cdot m'} \cdot e^{j\frac{2\pi}{N}(k_0+1/2) \cdot m'} \cdot x''_{SEQ}[m']$$

$$= \beta_{PRACH} \cdot e^{j\frac{2\pi}{KN}(\varphi + \lfloor N_{ZC}/2 \rfloor + K \cdot (k_0+1/2)) \cdot m'} \cdot x''_{SEQ}[m']$$

where $$X''[k'] = \begin{cases} X[k], & k' = 0, \ldots, \lfloor N_{ZC}/2 \rfloor & k = \lfloor N_{ZC}/2 \rfloor, \ldots, N_{ZC}-1 \\ X[k], & k' = N' \cdot K - \lfloor N_{ZC}/2 \rfloor, \ldots, N \cdot K - 1, & k = 0, \ldots, \lfloor N_{ZC}/2 \rfloor - 1. \\ 0, & k' = \lfloor N_{ZC}/2 \rfloor + 1, \ldots, K \cdot N' - \lfloor N_{ZC}/2 \rfloor - 1 \end{cases}$$

Figure 4:
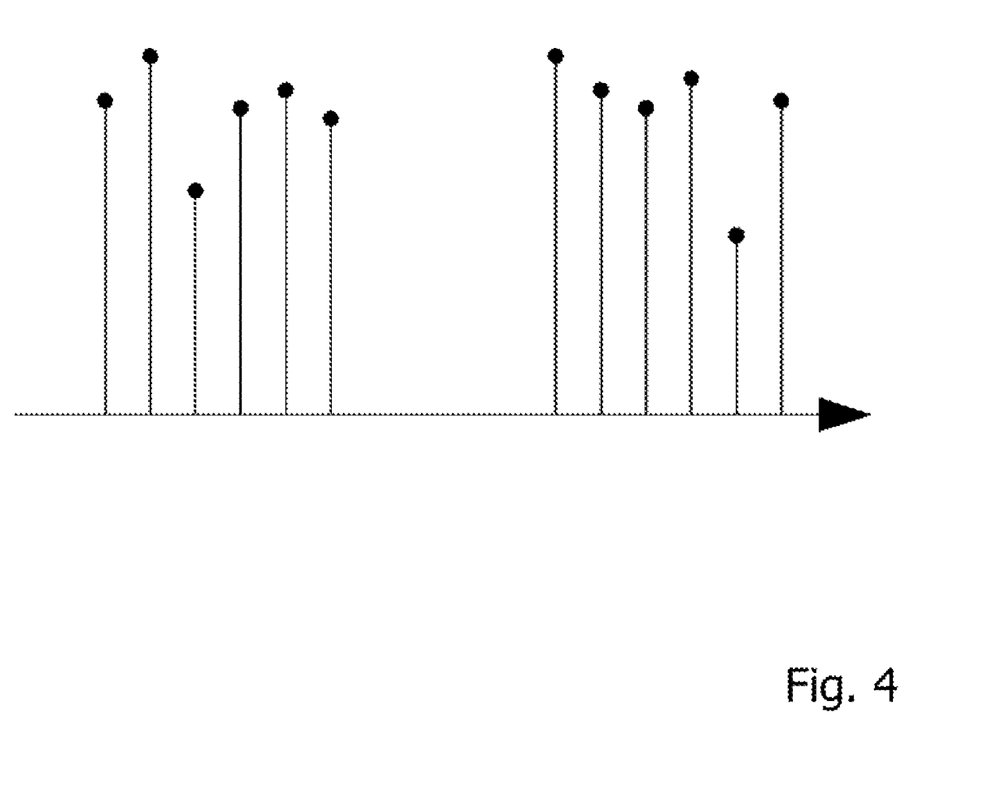
FIG. 4 illustrates an interpolation operation in the frequency domain.

This re-arranged term corresponds to zero padding in the conventional manner between the lower and upper half of the spectrum X[k] as illustrated in FIG. 4.

The sub-sampled sequence x"SEQ[m'] will be extended by the Cyclic Prefix (CP) by the formatter 30 (step 312 in FIG. 3) in the conventional way by copying the corresponding last samples to its beginning. This extension yields $x[m'']=x'SEQ[(m''+M_{SEQ}-M_{CP}) \bmod M_{SEQ}]$, $m''=0, \ldots, (M_{SEQ}+M_{CP})-1, M_{SEQ}=1.536(1.152)$.

$M_{CP}$ is derived from table 5.7.1-1 in section 5.7.1 of TS 36.211 by dividing the integer factors before $T_s$ in this table by 16. The CP insertion described above is valid for preamble formats 0, 1 and 4. For formats 2 and 3, a second instance of x'SEQ[m'] is appended, yielding $x[m'']=x"SEQ[(m''+2 \cdot M_{SEQ}-M_{SEQ}]$, $m''=0, \ldots, (2 \cdot M_{SEQ}+M_{CP})-1, M_{SEQ}=1.536(1.152)$.

x[m''] will be up-sampled by the up-sampling unit 32 in step 312 of FIG. 3 according to the sample rate corresponding to the current transmission (or cell) bandwidth. Since $M_{SEQ}$ has been chosen to be power of 2 fraction of K·N, the option of applying polyphase up-sampling filters for interpolation exists. A cascade of up-sampling filters by a factor of 2 provides the solution with the lowest order (and thus lowest implementation cost). The cost can be further reduced using so called half-band filters.

Figure 5:
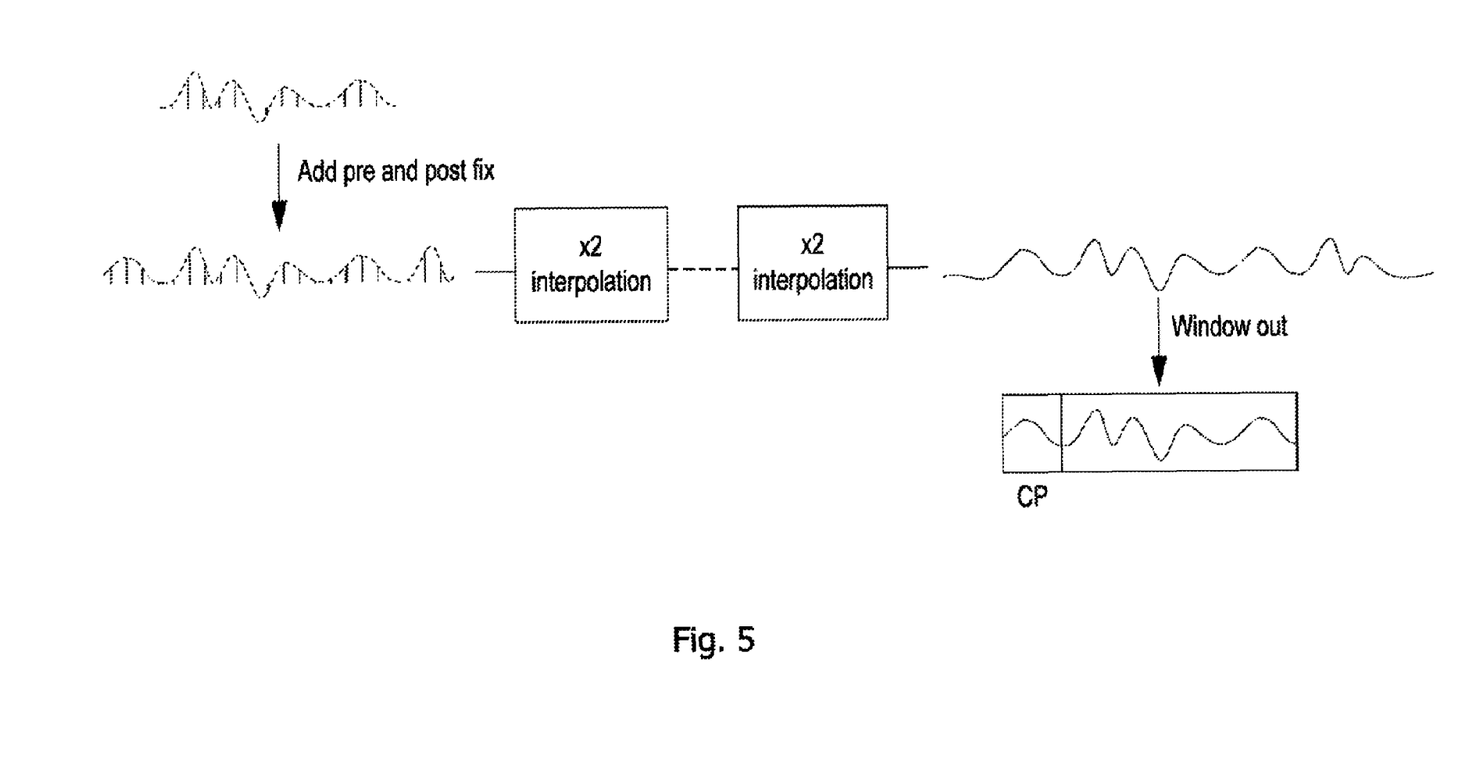
FIG. 5 illustrates a cyclic interpolation process using a cascade of up-sampling filters.

Up-sampling filters cause a filter transient that has to be compensated to preserve the cyclic properties of the signal. The compensation may involve a cyclic extension of the signal by the formatter 30 with a pre- and postfix of x[m''] at its beginning and end before up-sampling (see step 314). After the up-sampling, these parts have to be removed again as indicated in FIG. 3 for step 314. The transient component processing operations are shown in FIG. 5. Also shown in FIG. 5 is a cascade of interpolation up-sampling filters belonging to the up-sampling unit 32. Each filter corresponds to an up-sampling factor of 2.

The pre- and postfix insertion illustrated in FIG. 5 may be described as follows (using the above equations):

$x[m'']=x"SEQ[(m''+M_{SEQ}-M_{CP}-M_{pre}) \bmod M_{SEQ}]$ $m''=0, \ldots, (M_{SEQ}+M_{CP}+M_{pre}+M_{post})-1, M_{SEQ}=1536(1152)$.

preamble formats 0, 1 and 4, and in the corresponding manner for formats 2 and 3.

After up-sampling and removal of the transient components in step 314 (e.g., by using windowing techniques as shown in FIG. 5), the preamble sequence s'[m] is centered around DC, where the time index is described by $$m = 0, \ldots, (M_{SEQ} + M_{CP}) \cdot \frac{N}{128} - 1$$

for formats 0, 1, 4 respectively, and $$m = 0, \ldots, (2 \cdot M_{SEQ} + M_{CP}) \cdot \frac{N}{128} - 1$$

for formats 2, 3, with N being either of the values [128, 256, 512, 1.024, (1.536), 2.048] for the different bandwidths specified for by the LTE specification.

In a final step 316, the spectrum of the PRACH random access signal will be shifted by the frequency shifter 34 to its designated location on the frequency axis. This shifting is done in the time domain according to $$s[m] = s'[m] \cdot e^{j\frac{2\pi}{KN}\kappa \cdot m},$$

where s[m] is the final PRACH random access signal as described above and $$e^{j\frac{2\pi}{KN}\kappa \cdot m} = e^{j\frac{2\pi}{KN}(\varphi + \lfloor N_{ZC}/2 \rfloor + K \cdot (k_0 + \frac{1}{2})) \cdot m}$$

is a linear phase ramp representative of the frequency shift. The term $$\kappa = \varphi + \lfloor N_{ZC}/2 \rfloor + K \cdot \left(k_0 + \frac{1}{2}\right)$$

describes the frequency shift in number of PRACH sub-carriers, where $k_0$ is the parameter that is used to adjust the location on the frequency axis.

The resulting random access signal s[m] is then output by the frequency shifter 34 to the RF stage 22 of FIG. 2 for being up-converted, amplified and transmitted.

Figure 6:
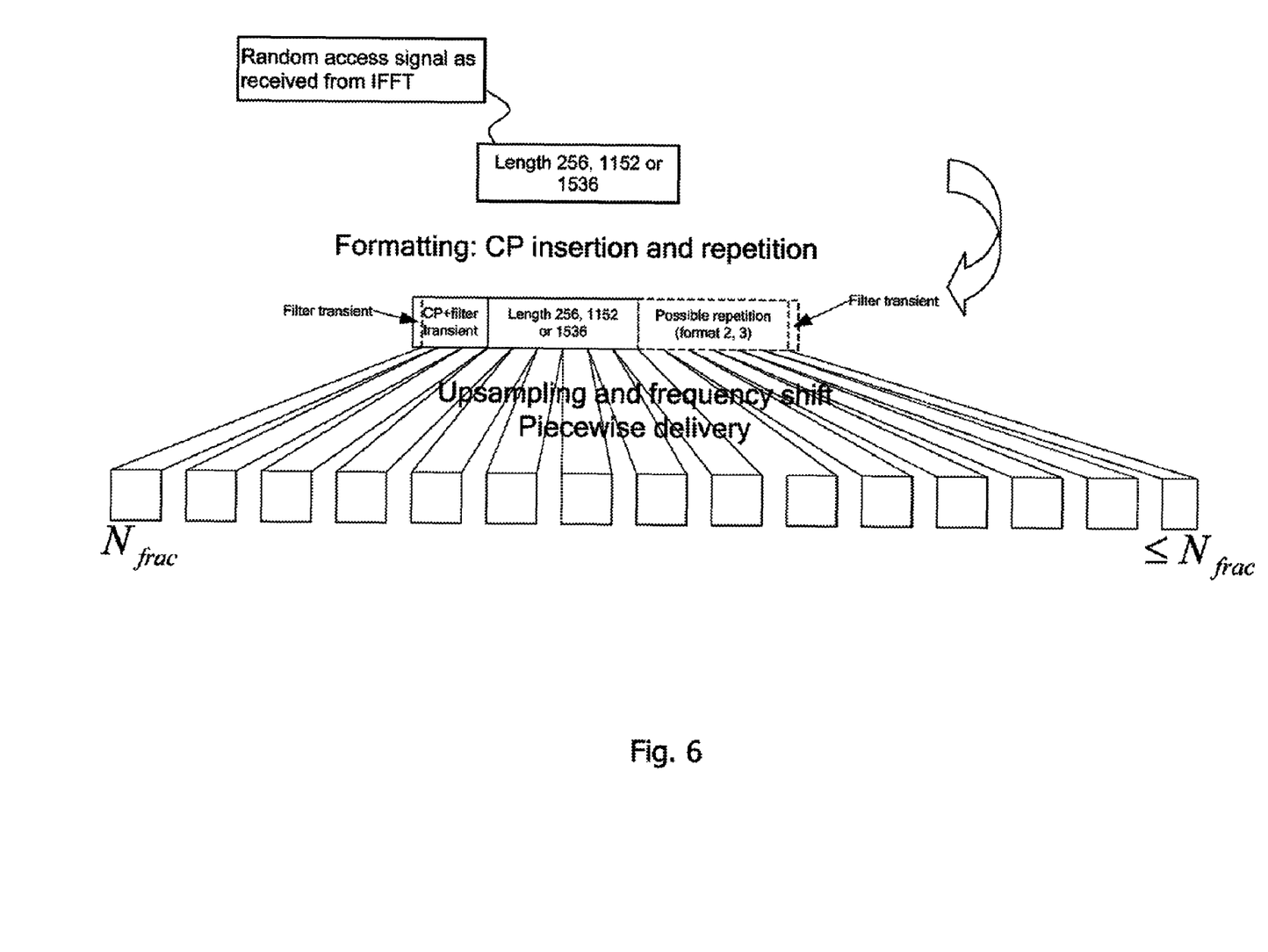
FIG. 6 illustrates a processing flow for a fractional generation and delivery of a PRACH preamble signal.

Since the interpolation using filters allows a streaming-like processing rather than the IFFT of step 310 (which has to process the signal in a single block), one variant of the present embodiments contemplates an even more pronounced reduction of memory requirements by generating the PRACH random access signal in consecutive fractions as illustrated in FIG. 6. The fractional approach simply requires that the units for up-sampling, formatting and allocation (i.e., frequency shift) can be started and stopped multiple times while keeping their internal states. Each time a fraction is computed, it is directly output to the RF stage 22 and transmitted over the one or more antennas so that the memory it occupies can be simply overwritten by the next fraction. In this way, the memory demand can be considerably reduced.

As has become apparent from the above description of preferred embodiments, the combination of a small size IDFT (and in particular a small size IFFT) with interpolation techniques permits an efficient SC-FDMA signal generation. Depending on the specific implementation, memory demands (e.g., buffer sizes) can be reduced, in particular in combination with a fractional SC-FDMA signal processing.

It is believed that many advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method of generating a Single-Carrier Frequency Division Multiple Access (SC-FDMA) signal having a transmission bandwidth and a Constant Amplitude Zero-Autocorrelation (CAZAC) sequence of length $N_{CAZAC}$, wherein the SC-FDMA signal has a time-domain formulation with a term representative of an Inverse Discrete Fourier Transform (IDFT) of length M, where $M > N_{CAZAC}$, the method comprising the steps of:

providing a frequency-domain representation of the CAZAC sequence;

mapping the frequency-domain representation of the CAZAC sequence to $N_{CAZAC}$ of $M_{SEQ}$ frequency points, where $N_{CAZAC} < M_{SEQ} < M$;

filling the remaining $M_{SEQ} - N_{CAZAC}$ frequency points with zeros to obtain $M_{SEQ}$ frequency-domain samples;

applying an IDFT of size $M_{SEQ}$ to the resulting frequency-domain samples to obtain a sub-sampled time-domain representation of the CAZAC sequence; and up-sampling the sub-sampled time-domain representation of the CAZAC sequence according to the transmission bandwidth to generate the SC-FDMA signal.

2. The method of claim 1, wherein $M_{SEQ}$ is selected to be a power of two fraction of M.

3. The method of claim 1, herein a term $x_{SEQ}[m']$ representative of the IDFT has the form of:

$$x_{SEQ}[m'] = \left(\sum_{k'=0}^{M-1} X'[k'] \cdot e^{j\frac{2\pi}{M}k' \cdot m'}\right),$$

where:

m' is a discrete time variable; and

X'[k'] is derived from the frequency-domain representation X[k] of the CAZAC sequence.

4. The method of claim 3, wherein the term $x_{SEQ}[m']$ representative of the IDFT is derived from the frequency-domain representation X[k] of the CAZAC sequence using zero-padding.

5. The method of claim 4, wherein zero-padding is performed in accordance with $$X'[k'] = \begin{cases} X[k], & k' = k = 0, \ldots, N_{CAZAC} - 1 \\ 0, & k' = N_{CAZAC}, \ldots, M - 1, \end{cases}$$

or $$X''[k'] = \begin{cases} X[k], & k' = 0, \ldots, \lfloor N_{CAZAC}/2 \rfloor & k = \lfloor N_{CAZAC}/2 \rfloor, \ldots, N_{CAZAC} - 1 \\ X[k], & k' = M_{SEQ} - \lfloor N_{ZC}/2 \rfloor, \ldots, M - 1, & k = 0, \ldots, \lfloor N_{CAZAC}/2 \rfloor - 1 \\ 0, & k' = \lfloor N_{CAZAC}/2 \rfloor + 1, \ldots, M_{SEQ} - \lfloor N_{CAZAC}/2 \rfloor - 1 \end{cases}.$$

6. The method of claim 1, further comprising adding a cyclic prefix to the sub-sampled time-domain representation of the CAZAC sequence prior to up-sampling.

7. The method of claim 1, wherein the up-sampling is performed using interpolation.

8. The method of claim 7, wherein the interpolation is performed using one or more filters.

9. The method of claim 1, further comprising the steps of:

adding a transient component to the time-domain representation of the CAZAC sequence prior to up-sampling; and removing the transient component after up-sampling has been performed.

10. The method of claim 1, further comprising applying a frequency shift to the SC-FDMA signal after up-sampling to shift the SC-FDMA signal to a designated frequency location.

11. The method of claim 10, wherein the frequency shift is expressed as $$s[m] = s'[m] \cdot e^{j\frac{2\pi}{M}\kappa \cdot m},$$

where:
m is a discrete time variable;
s[m] is the SC-FDMA signal after the frequency shift;
s'[m] is the SC-FDMA signal prior to the frequency shift; and
κ is a phase term representative of the frequency shift.

12. The method of claim 1, wherein the SC-FDMA signal is a Physical Random Access Channel (PRACH) signal, and the method further comprises performing, based on the PRACH signal, at least one of uplink synchronization and network attachment.

13. The method of claim 1, wherein the method is performed by a user terminal in accordance with the Long Term Evolution (LTE) or the LTE-Advanced standard.

14. A device for generating a Single-Carrier Frequency Division Multiple Access (SC-FDMA) signal having a transmission bandwidth and a Constant Amplitude Zero-Autocorrelation (CAZAC) sequence of length $N_{CAZAC}$, wherein the SC-FDMA signal has a time-domain formulation with a term representative of an Inverse Discrete Fourier Transform (IDFT) of length M, where $M > N_{CAZAC}$, the device comprising:
a provisioning unit for providing a frequency-domain representation of the CAZAC sequence;
a mapping unit for mapping the frequency-domain representation of the CAZAC sequence to $N_{CAZAC}$ of $M_{SEQ}$ frequency points, where $N_{CAZAC} < M_{SEQ} < M$, and for filling the remaining $M_{SEQ} - N_{CAZAC}$ frequency points with zeros to obtain $M_{SEQ}$ frequency-domain samples;
an IDFT unit for applying an IDFT of size $M_{SEQ}$ to the resulting frequency-domain samples to obtain a sub-sampled time-domain representation of the CAZAC sequence; and
an up-sampling unit for up-sampling the sub-sampled time-domain representation of the CAZAC sequence according to the transmission bandwidth to generate the SC-FDMA signal.

15. The device of claim 14, wherein the up-sampling unit comprises at least one of an interpolator, a filter, and a filter bank.

16. The device of claim 14, further comprising a cyclic prefix adder for adding a cyclic prefix to the sub-sampled time-domain representation of the CAZAC sequence prior to up-sampling.

17. The device of claim 14, further comprising a frequency shifter for applying a frequency shift to the SC-FDMA signal after up-sampling to shift the SC-FDMA signal to a designated frequency location.

18. The device of claim 14, wherein the device is implemented in a mobile user terminal.

* * * * *